Figure 1:
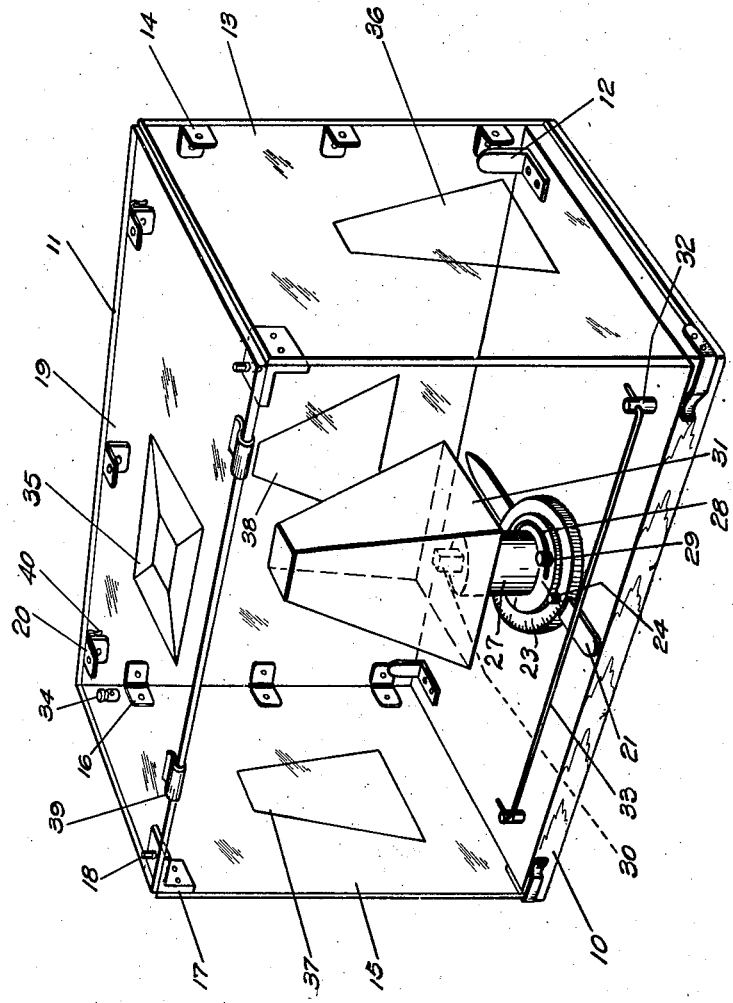

Dec. 7, 1943.　　　A. L. HOWARD　　　2,335,941
EDUCATIONAL APPARATUS
Filed Sept. 25, 1941　　　2 Sheets-Sheet 1

INVENTOR.
Albert L. Howard.
BY  by Henway & Witter
Attys.

Dec. 7, 1943.   A. L. HOWARD   2,335,941
EDUCATIONAL APPARATUS
Filed Sept. 25, 1941   2 Sheets-Sheet 2
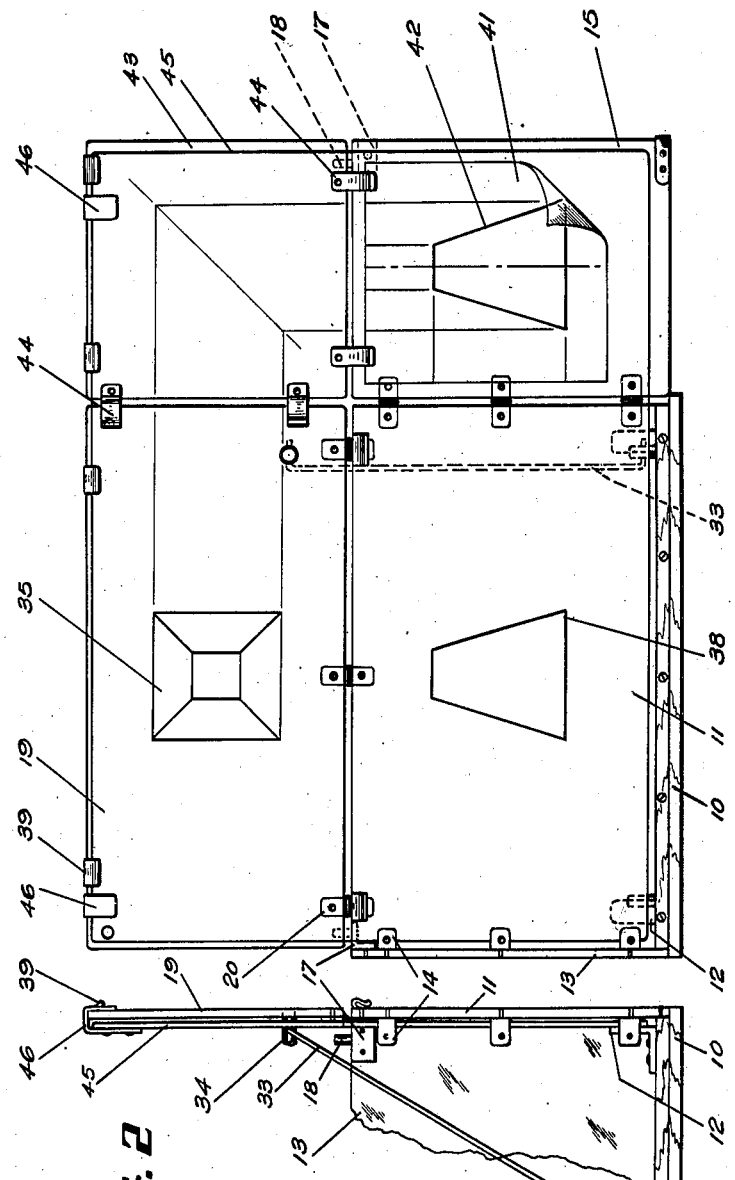
INVENTOR.
Albert L. Howard.
BY Kenway & Witter
Attys.

Patented Dec. 7, 1943

2,335,941

UNITED STATES PATENT OFFICE 2,335,941

EDUCATIONAL APPARATUS

Albert L. Howard, Brockton, Mass.

Application September 25, 1941, Serial No. 412,258

6 Claims. (Cl. 35—26)

This invention relates to apparatus for demonstrating the principles of mechanical projection. Such apparatus may be usefully employed in drawing classes or in demonstrations before any audience. In one aspect the present invention comprises improvements in the apparatus of my prior Patent No. 1,327,474, and in another aspect it comprises improvements that may be embodied advantageously in other types of apparatus.

The invention requires the employment of relatively large and transparent panels and, whereas my patented apparatus employed glass for these panels which as thus constructed were so heavy and fragile and otherwise so objectionable and inadaptable as largely to render the apparatus impractical, my present invention eliminates these objections and renders the apparatus highly practical by employing suitable transparent plastic material of light and tough construction for these panels this change of construction being one of the important features of the invention for reasons hereinafter described.

The apparatus of my invention includes panels arranged to form a rectangular enclosure about the object under discussion. The various panels constitute in space the planes upon which the different projections of the object are made in accordance with the adopted principles of mechanical drawing; that is to say, the top panel represents the plane of projection for plan views, the back or front panels the planes for the corresponding horizontal projections, and the end panels the planes for horizontal end projections. The actual projections may be drawn directly upon these panels or may be depicted through the medium of transfer sheets temporarily secured in place upon the various panels. In this way the student is shown graphically how the various projections are made directly from the object.

Having made the projections in their actual position in space it now remains to show how they are disposed upon a flat sheet of drawing paper. In accordance with the present invention this is demonstrated by mounting one of the panels permanently in vertical position upon a suitable base and connecting the other panels thereto by hinges which permit them to be all swung into a single vertical plane coincident with that of the original supported panel. When once so positioned means are provided for supporting the assembled panels in a single vertical plane with the various projections located as they would be conventionally located on a flat sheet of drawing paper.

Another feature of the invention consists in a supplementary sheet or back drop arranged to be temporarily secured to the assembled vertical panels, to make a background for the projections depicted thereon, and, if desired, to assist in maintaining the individual panels in a single plane.

Other features of my invention relate to the construction of the object support which is herein shown as adjustable in a definite path toward or from any given panel of the enclosure and also angularly about its own vertical axis. In this connection a feature of the invention consists in an elongated track which is secured to the base of the apparatus for angular adjustment and upon which slides the object support. The support itself is angularly adjustable about a vertical axis and may have further provision for adjustment about a horizontal axis if desired.

These and other features of the invention will be best understood and appreciated from the following description of a preferred embodiment thereof and of various alternative object supports selected for purposes of illustration and shown in the accompanying drawings in which—

Fig. 1 is a view in perspective of the apparatus with an object mounted therein, Fig. 2 is a fragmentary view in end elevation showing the apparatus with some of its walls swung into a single vertical plane, and Fig. 3 is a corresponding view in front elevation.

The illustrated apparatus comprises a wooden base 10 rectangular in shape and of sufficient weight and thickness to support the walls of the apparatus either in their closed position, as shown in Fig. 1, or their vertical position, as shown in Fig. 2. To the rear wall of the base 10 is rigidly secured a rear transparent panel 11 by means of screws as shown in Fig. 3. A right hand end panel 13 is connected by hinges 14 to the rear panel 11 and arranged to swing about a vertical axis. Similarly a left hand panel 15 is connected by hinges 16 to the rear panel and also arranged to swing about a vertical axis. To each of the end panels is secured an angular bracket 17 carrying a short vertical stud 18 arranged to enter corresponding holes in the top panel 19 which is connected to the upper edge of the rear panel 11 by hinges 20 and arranged to swing about a horizontal axis. The four panels above described are formed of plastic transparent sheet material, such as "Tenite," which is tough and light and practically unbreakable.

Mounted upon the base 10 is an angularly adjustable track or guideway 21 having undercut side walls, as shown in Fig. 1. The track 21 is held rigidly in any desired angular position by a clamping bolt or the like, not shown. Upon the track 21 is mounted for sliding movement a circular bottom portion or carrier 23 for the object support. The bottom portion or carrier is provided with an undercut groove in its lower face corresponding in cross section to that of the track 21 and a set screw 24 threaded into the base and, bearing upon the track 21, serves the purpose of locking the support securely in any position of longitudinal adjustment on the track 21. The bottom portion 23 carries upon the circumferential margin of its upper face a 360° scale and concentrically disposed within this is a disk portion of the support. The disk and stem are mounted to turn about a vertical axis concentric with that of the bottom portion 23 and the disk portion is provided with an arcuate slot 28 for a set screw 29 which is threaded into the bottom portion 23 and serves to lock the support in any desired angular position. From the disk portion 26 projects the stem 27 which may take various forms best adapted to support the object under investigation. As shown in Fig. 1 the post is provided with a square stud 30 and in this instance the object supported thereon is a truncated pyramid 31.

The base 10 of the apparatus is shown as provided with a pair of perforated studs 32 on and between which is supported a rod 33 having its ends bent at right angles. When the various panels are swung into vertical position, as shown in Fig. 2, the rod 33 is detached from the right hand stud 32 and engaged with a similar stud 34 normally projecting downwardly from the top panel 19 but being swung into horizontal position when the panel 19 is itself swung into vertical position as shown in Fig. 2. The rod 33 and its alternative connections thus serve as detachable means for holding the panels in a vertical plane.

The apparatus thus far explained may be used to demonstrate the proper shape and location of the various projections of the pyramid 31, or any other object located upon the support, upon the various planes represented by the end, rear and top panels. For instance, the plan projection 35 of the pyramid is shown on the top panel, 19, the correct horizontal projections 36 and 37 are shown on the right and left hand end panels 13 and 15, and the rear (or front) elevational projection 38 is shown on the rear panel 11. To assist the student in visualizing the projections thus indicated the object may be moved temporarily upon the track 21 close up to any one of the vertical panels.

The employment of transparent plastic composition for the panels is an important feature of the invention both economically and functionally. Each panel is solely a sheet of tough and light weight plastic material with no binding whatever at the edges, whereas glass panels require metal or wood frames at the edges (see Fig. 6 of Patent 1,327,474) to eliminate the cutting hazard and prevent chipping. The plain plastic material panels permit drilling and working with ordinary wood and metal tools whereby permitting ordinary hinges, etc. to be conveniently attached directly thereto and provides for easy repair replacements with available materials. The plain edged panels furthermore provide full vision, eliminate frame rusting and warping and reduces cost to a minimum. The character and light weight of the panels also greatly facilitate the use and manipulation of the apparatus and are of particular advantage in schools where students can be permitted its use freely without danger of breakage. The plastic material panels furthermore give the apparatus a better appearance and render it far more durable in many respects.

Instead of delineating the projections directly upon the transparent panels of the apparatus, the latter may be used as supports for transfer sheets and to this end the top panel 19 is provided with a pair of clips 39 at its forward edge and the hinges 20 are provided with supplemental leaves 40 forming clips for supporting a transfer sheet upon the rear panel 11. The demonstrator's time may be often saved by simply applying a transfer sheet to one or another of the panels having a previously drawn projection of the object thereon; for example, in Fig. 3 the transfer sheet 41 is shown as supported upon the end panel 15 and as having depicted thereon the right hand horizontal projection 42 of the object.

As shown also in Fig. 3, a supplementary square panel 43 having clips 44 on two sides is detachably connected by its clips to the end panel 15 and the top panel 19 thus completing the rectangle and representing the missing corner of the hinged assembly. This detachable panel may be used by the demonstrator as containing a 45° axis of projection showing the relationship between the plan and end projections of the object. The panel 43 like the other panels already described may be formed of plastic transparent sheet material.

In Figs. 2 and 3 the vertical assembly of panels is shown as provided with a back-drop in the form of a heavy sheet 45 of cardboard or the like provided at its upper edge with clips 46 by which it may be detachably secured to the upper edges of the panels 19 and 43. When in position the back-drop 45 provides a white background causing the actual projection on the transparent panels to stand out conspicuously, and also assists in holding the panels in a single plane.

The panel 11 has been referred to herein as the rear or back panel of the apparatus as shown in the drawings, but it will be understood that from the standpoint of the class or of the observer this panel 11 is the front panel.

Having thus disclosed my invention and described in detail the best embodiment thereof now known to me I claim as new and desire to secure by Letters Patent:

1. A device for illustrating mechanical projection, comprising a substantially flat base, transparent panels connected to the edges thereof by clips, a track on the top face of the base, means supporting the track for angular adjustment about an axis perpendicular to said face and to positions pointing the track toward said panels, and an object support mounted for adjustment on and along the track.

2. A device for illustrating mechanical projection, comprising a base, a stationary rear panel of tough and non-fragile transparent plastic material erected on the base and supported in vertical position thereby, side and top panels of said material, hinges affixed directly to the panels adjacent to edges thereof and hinging the side and top panels to the stationary panel to swing thereon into the vertical plane thereof, and detachable means for supporting the assembled panels in such vertical plane.

3. A device for illustrating mechanical projection, comprising a base, a rectangular enclosure of connected rear, end and top panels of tough and non-fragile transparent plastic material mounted thereon, means secured directly to the panels adjacent to their edges for detachably holding transfer sheets, means for releasably maintaining the panels in rectangular form, and detachable means for supporting the panels in a single plane perpendicular to the base and in the plane of the rear panel.

4. A device for illustrating mechanical projection, comprising a base, a rear stationary panel mounted thereon, side panels hinged to swing about vertical axes on and at the vertical edges of the rear panel, an object support mounted on the base and guided for movement into proximity to the rear panel or either of the side panels, upwardly extending locking studs on the top corners of the side panels remote from the rear panel, and a top panel of tough and non-fragile transparent plastic material hinged to the stationary rear panel and having apertures for detachably fitting said studs.

5. In a device for illustrating mechanical projection, a rectangular base, a transparent stationary rear panel erected on the base and supported in vertical position thereby, side and top transparent panels hinged to the stationary panel and located in the plane thereof, said side and top panels being movable on their hinges to a position forming together with the rear panel a rectangular enclosure on the base, detachable means for supporting the panels in said plane, a stiff and light-colored backdrop adapted to be located adjacent to one face of the panel assembly to form a background therefor, and detachable means for supporting the backdrop in such position relative to the panel assembly, the backdrop causing projections on the panels to stand out conspicuously and, when attached edge to edge to respective abutting panels, assisting to maintain the said panels in said single plane.

6. A device for illustrating mechanical projection, comprising a substantially flat and rectangular base, transparent side and top panels erected thereon, an elongated track pivotally mounted on the base beneath the top panel for angular adjustment about a vertical axis, a carrier engaging and slidable on the track, an object support mounted on the carrier, and means for adjusting the object support vertically and about horizontal and vertical axes.

ALBERT L. HOWARD.